United States Patent [19]
Satterfield

[11] Patent Number: 6,061,097
[45] Date of Patent: May 9, 2000

[54] INTERACTIVE TELEVISION PROGRAM GUIDE WITH SELECTABLE NON-PROGRAM OPTIONS

[75] Inventor: Kevin D. Satterfield, Mannford, Okla.

[73] Assignee: United Video Properties, Inc., Tulsa, Okla.

[21] Appl. No.: 08/858,984

[22] Filed: May 22, 1997

[51] Int. Cl.[7] .................................................. H04N 5/50
[52] U.S. Cl. .......................... 348/569; 348/906; 345/327
[58] Field of Search ................................. 348/906, 569, 348/564, 722, 10, 12, 13, 7; 345/327, 328; 455/4.2

[56] References Cited

U.S. PATENT DOCUMENTS

| | | | |
|---|---|---|---|
| 4,031,548 | 6/1977 | Kato et al. | 358/188 |
| 4,081,753 | 3/1978 | Miller | 325/396 |

(List continued on next page.)

FOREIGN PATENT DOCUMENTS

| | | | |
|---|---|---|---|
| 23 38 380 | 2/1975 | Germany . | |
| 33 37 204 | 4/1985 | Germany | H04N 5/44 |
| 59-141878 | 8/1984 | Japan | H04N 5/64 |
| 60-61935 | 4/1985 | Japan | G11B 15/02 |
| 1 554 411 | 10/1979 | United Kingdom | H04B 3/54 |
| 2 034 995 | 6/1980 | United Kingdom | H33J 7/18 |
| 2 126 00 | 3/1984 | United Kingdom | G11B 15/02 |
| 2 232 031 | 11/1990 | United Kingdom | H04N 5/445 |
| 2 264 409 | 8/1993 | United Kingdom | H04N 5/445 |
| WO 95/01056 | 1/1955 | WIPO | H04N 7/16 |
| WO 86/01359 | 2/1986 | WIPO | H04N 5/445 |
| WO 90/07844 | 7/1990 | WIPO | H04N 5/782 |
| WO 91/05436 | 4/1991 | WIPO | H04N 5/44 |
| WO 94/13107 | 6/1994 | WIPO | H04N 7/16 |
| WO 95/28799 | 10/1995 | WIPO | H04N 1/00 |
| WO 95/32583 | 11/1995 | WIPO | H04N 5/445 |
| WO 95/32585 | 11/1995 | WIPO | H04N 7/10 |
| WO 96/09721 | 3/1996 | WIPO | H04N 7/025 |
| WO 96/13935 | 5/1996 | WIPO | H04N 7/08 |
| WO 96/17473 | 6/1996 | WIPO | H04N 5/445 |
| WO 96/31980 | 10/1996 | WIPO | H04N 5/445 |
| WO 96/41478 | 12/1996 | WIPO | H04N 7/713 |
| WO 97/42783 A1 | 11/1997 | WIPO | H04N 7/173 |

OTHER PUBLICATIONS

A. James, "Oracle—Broadcasting the Written Word," Wireless World, Jul. 1973, pp. 314–316.

G. A. McKenzie, "Oracle—An Information Broadcasting Service Using Data Transmission in the Vertical Interval," Journal of the SMPTE, Jan. 1974, pp. 6–10.

S. M. Edwardson and A. Gee, "CEEFAX: A Proposed New Broadcasting Service," Journal of the SMPTE, Jan. 1974, pp. 14–19.

E. Bryan Carne, "The Wired Household," IEEE Spectrum, Oct. 1979, pp. 61–66.

"Addressable Converters: A New Development at Cable Data," Via Cable, Dec. 1981, pp. 1–11.

Hofmann, Neumann, Oberlies, and Schadwinkel, "Videotext Programmiert Videorecorder," Rundfunktechnische Mitteilungen. Nov.–Dec. 1982, pp. 254–257.

(List continued on next page.)

*Primary Examiner*—Victor R. Kostak
*Attorney, Agent, or Firm*—Fish & Neave; G. Victor Treyz; Michelle Waites

[57] ABSTRACT

An interactive program guide system is provided. The program guide system displays a program guide grid on a user's television equipment. The grid contains rows of television program listings for various channels. Columns in the grid are associated with the scheduled start times of the listed programs. The grid also contains non-program listings. Non-program listings rows contain selectable non-program options, such as options related to weather or sports information. The user can select a given one of the selectable non-program options by positioning a highlight region on one of the options and pressing an appropriate key on a remote control. When the system receives the corresponding command from the remote control, the system displays additional information for the selected non-program option on the user's display screen.

39 Claims, 8 Drawing Sheets

U.S. PATENT DOCUMENTS

| | | | |
|---|---|---|---|
| 4,170,782 | 10/1979 | Miller | 358/84 |
| 4,203,130 | 5/1980 | Doumit et al. | 358/1 |
| 4,305,101 | 12/1981 | Yarbrough et al. | 360/69 |
| 4,329,684 | 5/1982 | Monteath et al. | 340/707 |
| 4,375,651 | 3/1983 | Templin et al. | 358/191.1 |
| 4,381,522 | 4/1983 | Lambert | 358/86 |
| 4,390,901 | 6/1983 | Keiser | 358/147 |
| 4,394,691 | 7/1983 | Amano et al. | 358/194.1 |
| 4,425,579 | 1/1984 | Merrell | 358/86 |
| 4,429,385 | 1/1984 | Cichelli et al. | 370/92 |
| 4,488,179 | 12/1984 | Krüger et al. | 358/181 |
| 4,495,654 | 1/1985 | Deiss | 455/151 |
| 4,527,194 | 7/1985 | Sirazi | 358/86 |
| 4,598,288 | 7/1986 | Yarbrough et al. | 340/825.34 |
| 4,635,121 | 1/1987 | Hoffman et al. | 358/188 |
| 4,641,205 | 2/1987 | Beyers, Jr. | 360/33.1 |
| 4,689,022 | 8/1987 | Peers et al. | 434/307 |
| 4,691,351 | 9/1987 | Hayashi et al. | 380/10 |
| 4,706,121 | 11/1987 | Young | 358/142 |
| 4,712,105 | 12/1987 | Köhler | 340/825.69 |
| 4,737,993 | 4/1988 | DeVilbiss | 455/180 |
| 4,751,578 | 6/1988 | Reiter et al. | 358/183 |
| 4,754,326 | 6/1988 | Kram et al. | 364/900 |
| 4,787,063 | 11/1988 | Muguet | 364/900 |
| 4,802,114 | 1/1989 | Sogame | 364/900 |
| 4,807,052 | 2/1989 | Amano | 358/194.1 |
| 4,841,368 | 6/1989 | Rumbolt et al. | 358/194.1 |
| 4,908,713 | 3/1990 | Levine | 358/335 |
| 4,916,329 | 4/1990 | Dang et al. | 307/66 |
| 4,963,994 | 10/1990 | Levine | 358/335 |
| 4,977,455 | 12/1990 | Young | 358/142 |
| 5,027,400 | 6/1991 | Baji et al. | 380/20 |
| 5,038,211 | 8/1991 | Hallenbeck | 358/142 |
| 5,047,867 | 9/1991 | Strubbe et al. | 358/335 |
| 5,099,319 | 3/1992 | Esch et al. | 358/86 |
| 5,123,046 | 6/1992 | Levine | 380/10 |
| 5,151,789 | 9/1992 | Young | 358/194.1 |
| 5,172,413 | 12/1992 | Bradley et al. | 380/20 |
| 5,210,611 | 5/1993 | Yee et al. | 358/191.1 |
| 5,223,924 | 6/1993 | Strubbe | 358/86 |
| 5,253,066 | 10/1993 | Vogel | 358/188 |
| 5,283,639 | 2/1994 | Esch et al. | 348/6 |
| 5,323,240 | 6/1994 | Amano et al. | 348/731 |
| 5,353,121 | 10/1994 | Young et al. | 348/731 |
| 5,404,393 | 4/1995 | Remillard | 379/96 |
| 5,410,344 | 4/1995 | Graves et al. | 348/1 |
| 5,412,720 | 5/1995 | Hoarty | 380/15 |
| 5,444,499 | 8/1995 | Saitoh | 348/734 |
| 5,465,113 | 11/1995 | Silboy | 348/5.5 |
| 5,465,385 | 11/1995 | Ohga et al. | 455/6.1 |
| 5,479,268 | 12/1995 | Young et al. | 358/335 |
| 5,481,296 | 1/1996 | Cragun et al. | 348/13 |
| 5,532,918 | 7/1996 | Mayrand et al. | 363/89 |
| 5,553,083 | 9/1996 | Miller | 371/32 |
| 5,585,838 | 12/1996 | Lawler et al. | 348/13 |
| 5,585,866 | 12/1996 | Miller et al. | 348/731 |
| 5,589,892 | 12/1996 | Knee et al. | 348/731 |
| 5,594,509 | 1/1997 | Florin et al. | 348/906 |
| 5,596,373 | 1/1997 | White et al. | 348/569 |
| 5,596,479 | 1/1997 | Campbell et al. | 361/643 |
| 5,635,978 | 6/1997 | Alten | 348/906 |
| 5,650,826 | 7/1997 | Eitz | 348/906 |
| 5,940,073 | 8/1999 | Klosterman et al. | 345/327 |

OTHER PUBLICATIONS

H. Eckhard Krüger, "Das Digitale Fernsehkennungssystem ZPS," Nachrichtentechnische Zeitschrift, Jun. 1982, pp. 368–376.

Arthur Heller, "VPS a New System for Domestic VCR Start/Stop By Programme Labels Transmitted Within the Insertion Data Line," Symposium Record, Broadcast Sessions, 14th International TV Symposium, Montreux, Switzerland, Jun. 6–12, 1985, pp. 345–351.

Arthur Heller, "VPS—Ein Neues System Zur Beitragsgesteuerten Programmaufzeichnung," Rundfunktechnische Mitteilungen, Jul.–Aug. 1985, pp. 161–169.

W. Sommerhäuser, "Flexibel Programmieren Mit VPS," Funkschau 25, 1985, pp. 47–51.

Michael E. Long, "The VCR Interface," 1986 NCTA Technical Papers, pp. 197–202.

Richard G. Merrell, "Tac–Timer," 1986 NCTA Technical Papers, pp. 203–206.

Vito Brugliera, "Digital On–Screen Display: A New Technology for the Consumer Interface," Symposium Record, Cable Sessions, 18 th International Television Symposium and Technical Exhibition, Montreux, Switzerland, Jun. 10–15, 1993, pp. 571–586.

"A New Approach to Addressability," Cable Data product brochure, undated.

|  | 6:35 PM | 6:30 PM | 7:00 PM | 7:30 PM |
|---|---|---|---|---|
| 58 | SPORTS | LOCAL | COLLEGE | PROFESSIONAL |
| 52 | 2 KJRH | PROGRAM 1 | | PROGRAM 2 |
| 54 | 3 HBO | PROGRAM 1 | PROGRAM 2 | |
| 55 | 4 NBC | PROGRAM 1 | PROGRAM 2 | PROGRAM 3 |

| | | | | |
|---|---|---|---|---|
| | 6:35 PM | 7:00 PM | 7:30 PM | 8:00 PM |
| 56 → WEATHER | | LOCAL | 3-DAY | 5-DAY |
| 58 → SPORTS | | LOCAL | COLLEGE | PROFESSION-AL |
| 52 → | 2 KJRH | PROGRAM 1 | PROGRAM 2 | PROGRAM 3 |
| 54 → | 3 HBO | PROGRAM 2 | | PROGRAM 3 |

| 6:35 PM | 6:30 PM | 7:00 PM | 7:30 PM |
|---|---|---|---|
| WEATHER | LOCAL WEATHER<br><br>(LOCAL WEATHER INFORMATION HERE) | | |
| SPORT | | | |
| 2<br>KJRH | | | |
| 3<br>HBO | | | |

*FIG. 7*

INTERACTIVE TELEVISION PROGRAM GUIDE WITH SELECTABLE NON-PROGRAM OPTIONS

BACKGROUND OF THE INVENTION

This invention relates to video systems, and more particularly, to interactive television program guide systems in which non-program listings are interspersed with television program listings.

Cable, satellite, and broadcast television systems provide viewers with a large number of television channels. Users have traditionally consulted printed television program schedules to determine the programs being broadcast at a particular time. More recently, interactive electronic television program guides have been developed that allow television program information to be displayed on a user's television.

Interactive program guides allow the user to navigate through the television program listings using a remote control. In a typical program guide display, television listings are organized in a grid. Each row in the grid contains television program listings for a different channel. The columns in the grid correspond to a series of scheduled broadcast times. The user can scroll up or down to view program listings for different channels or may pan left or right to view information about programs being broadcast at different times.

However, the display grid in previously known interactive program guides has only been used to display program listings. If the user was interested in some other type of information, the user would have to exit the grid.

It is therefore an object of the present invention to provide an interactive television program guide that displays selectable non-program options in the grid in addition to program listings.

SUMMARY OF THE INVENTION

This and other objects of the invention are accomplished in accordance with the principles of the present invention by providing an interactive program guide system in which television program listings and selectable non-program options are simultaneously displayed in a grid. This format allows users to readily obtain non-program information without exiting the grid. Information for the program listings and non-program options may be provided by a data source in a satellite uplink facility. The information is transmitted to a television distribution facility such as a cable system headend via satellite link. The television distribution facility distributes the information (and television programming signals) to user television equipment. One suitable distribution scheme involves transmitting television programming on cable or satellite television channels and distributing the information for the program listings and non-program options in the vertical blanking interval of one of the channels or on a sideband.

User equipment for receiving and processing the television program listings and non-program options information may include a set-top box. The set-top box is also able to receive the television programming distributed by the television distribution facility. The set-top box processes television program listings and non-program options information and generates an interactive television program guide grid on a display screen such as a standard television monitor. The user can interact with the television program guide by entering commands via a user input interface. An illustrative user input interface is an infrared remote control with cursor keys, a "guide" button and an "enter" or "info" button.

When the user presses "guide," a program guide grid is displayed that contains television program listings in some rows and selectable non-program options in other rows. The user can position a highlight region on a desired entry using the cursor keys. Once the user has highlighted a desired non-program option, the user may depress the enter button. Selecting a non-program option in this way causes the set-top box to display additional information for the selected option. For example, if the selectable non-program option was "today's weather," making the selection would cause an information screen to appear containing additional information on today's weather.

The permitted range of movement of the highlight region within the grid depends on whether the highlight region is on a program listing or a non-program option. When the highlight region is on a program listing, the program listings can be panned left or right by manipulation of the cursor keys. The non-program options typically do not move when the program listings are panned. When the highlight region is on a non-program option, panning the highlight typically does not pan either the non-program options or the program listings.

Further features of the invention, its nature and various advantages will be more apparent from the accompanying drawings and the following detailed description of the preferred embodiments.

BRIEF DESCRIPTION OF THE DRAWINGS

FIGS. 4–7 are illustrative display screens in accordance with the present invention.

DETAILED DESCRIPTION OF THE PREFERRED EMBODIMENTS

Figure 1:
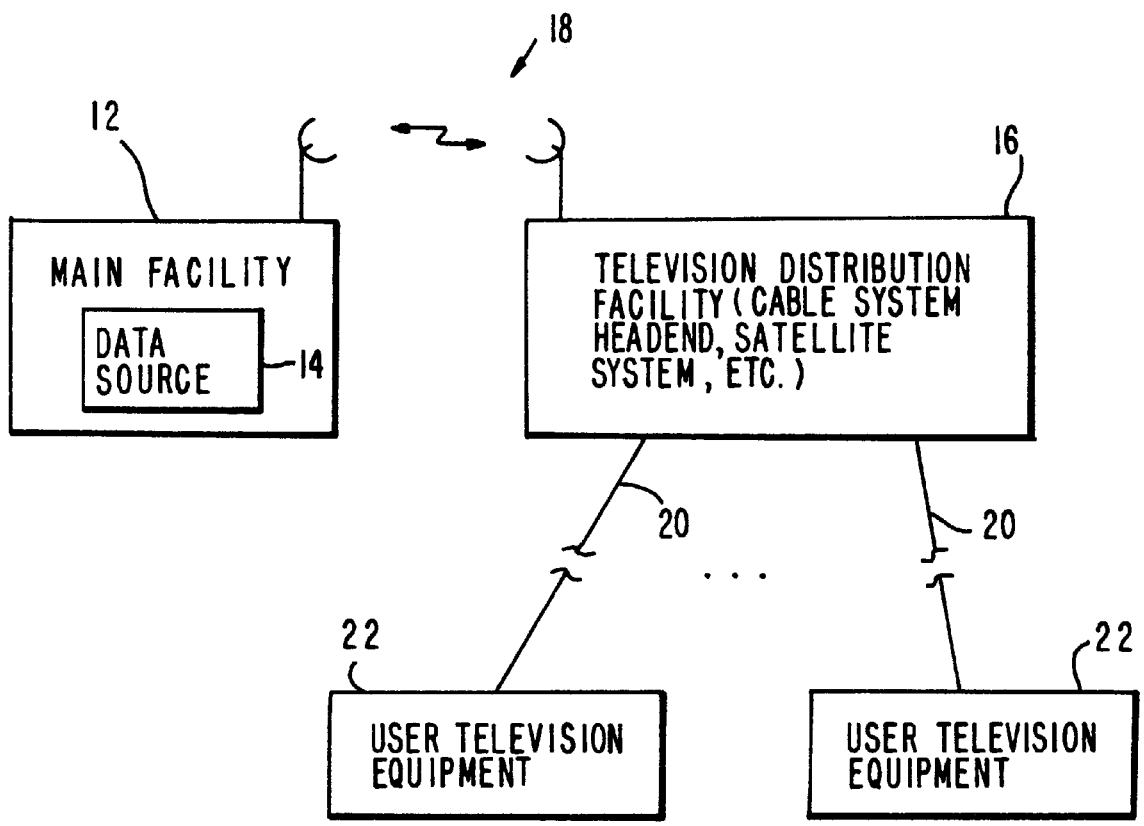
FIG. 1 is a schematic block diagram of a system in accordance with the present invention.

An illustrative system 10 in accordance with the present invention is shown in FIG. 1. Main facility 12 provides data from data source 14 to television distribution facility 16 via communications link 18. Link 18 may be a satellite link, a telephone network link, a cable or fiber optic link, a microwave link, a combination such links, or any other suitable communications path. If it is desired to transmit video signals over link 18 in addition to data signals, a relatively high bandwidth link such as a satellite link may generally be preferred to a relatively low bandwidth link such as a telephone line. Television distribution facility 16 may be a cable system headend, a broadcast distribution facility, or a satellite television distribution facility.

The data transmitted by main facility 12 to television distribution facility 16 includes television program listings data (e.g., program times, channels, titles, and descriptions) and data for additional services other than television program listings. If desired, the data for non-program listings may be provided using data sources at facilities other than main facility 12.

Television distribution facility 16 distributes the television program listings data and the data for non-program listings services to multiple users via communications paths 20. Each user has user television equipment 22 for displaying the television program listings and non-program listings information. Communications paths 20 preferably have sufficient bandwidth to allow television distribution facility 16 to distribute television programming to user television equipment. If desired, television programming may be provided over separate communications paths (not shown).

Figure 2:
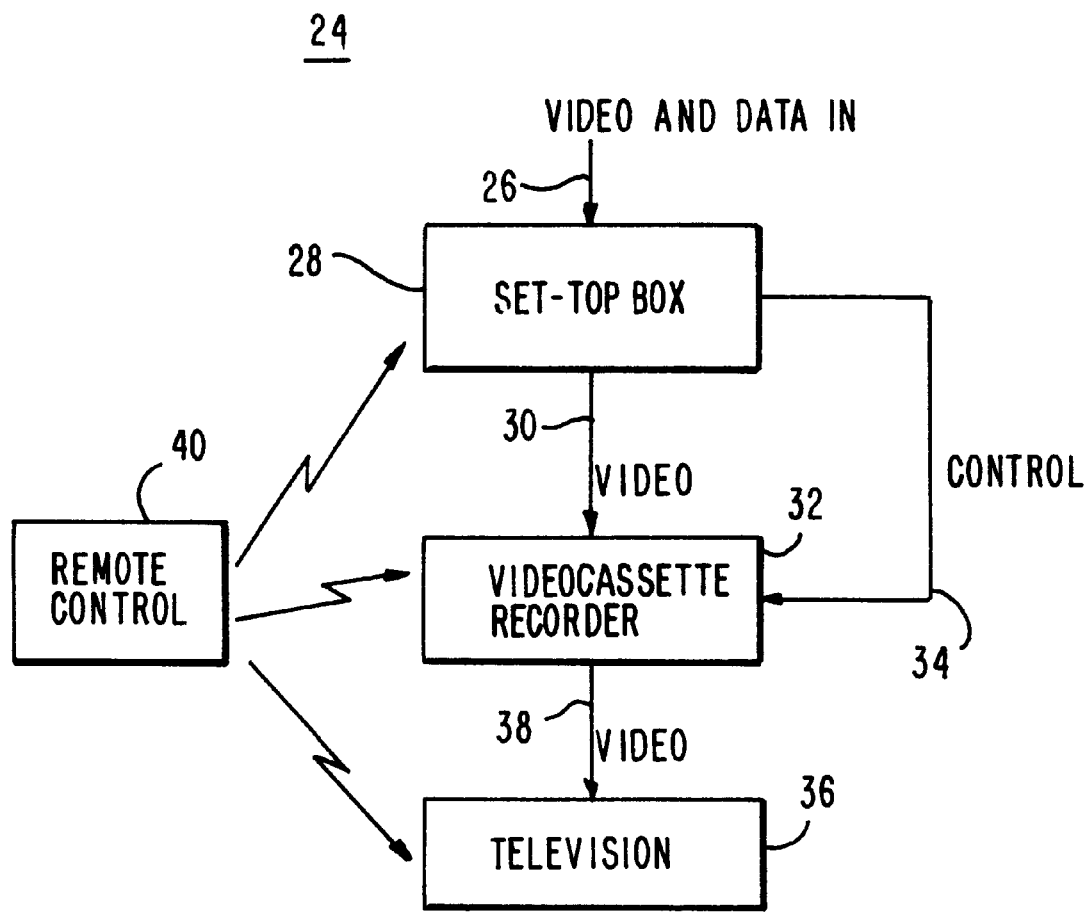
FIG. 2 is a schematic block diagram of illustrative user television equipment in accordance with the present invention.

An illustrative arrangement for user television equipment 22 is shown in FIG. 2. Television equipment 24 of FIG. 2 receives video and data from television distribution facility 16 (FIG. 1) at input 26. During normal television viewing, the user tunes set-top box 28 to a desired television channel. The signal for that television channel is then provided at video output 30 either as a radio-frequency (RF) signal on a predefined channel (e.g., channel 3 or 4) or as a demodulated video signal. The video signal at output 30 is received by videocassette recorder 32, so that the user may record programs. Program recording and other features may be controlled by set-top box 28 using control path 34. A typical control path 34 involves the use of an infrared transmitter coupled to the infrared receiver in videocassette recorder 32 that normally accepts commands from a remote control such as remote control 40. Remote control 40 may be used to control set-top box 28, videocassette recorder 32, and television 36.

Television 36 receives RF or demodulated video signals from videocassette recorder 32 via communications path 38. The video signals on communications path 38 may either be generated by videocassette recorder 32 when playing back a prerecorded videocassette or may by passed through from set-top box 28. During normal television viewing, the video signals provided to television 36 correspond to the desired channel to which the user has tuned with set-top box 28. When the user wishes to view interactive television program guide information, the user may press a "guide" button on remote control 40. When set-top box 28 receives commands from remote control 40 that inform set-top box 28 that the guide button has been pressed, processing circuitry within set-top box 28 supplies a grid of program guide information that is displayed on television 36.

Figure 3:
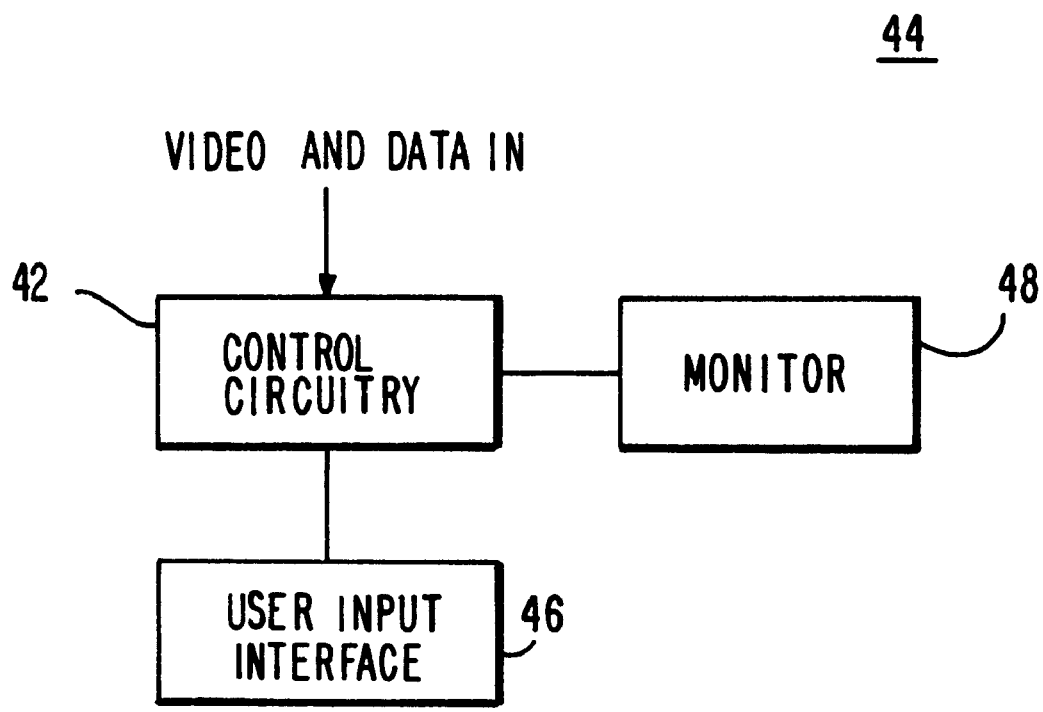
FIG. 3 is a generalized schematic block diagram of portions of the illustrative television equipment of FIG. 2.

A more generalized embodiment of user television facility 24 (FIG. 2) is shown in FIG. 3. As shown in FIG. 3, video and data from television distribution equipment 16 (FIG. 1) is received by control circuitry 42 of user television equipment 44. Video signals are typically provided on multiple television channels. Data may be provided on a television channel sideband, in the vertical blanking interval of a television channel, or by any other suitable data transmission technique.

The user controls the operation of user television equipment 44 with user input interface 46. User input interface 46 may be a pointing device, wireless remote control, keyboard, touch pad, voice recognition system, or any other suitable user input device. To watch television, the user instructs control circuitry 42 to display a desired television channel on monitor 48. To view program guide information, the user instructs control circuitry 42 to display a program guide grid on monitor 48.

The functions of control circuitry 42 may be provided using the set-top box arrangement of FIG. 2. Alternatively, these functions may be integrated into a television or videocassette recorder arrangement. If desired, a combination of such hardware arrangements may be used.

Figure 4:
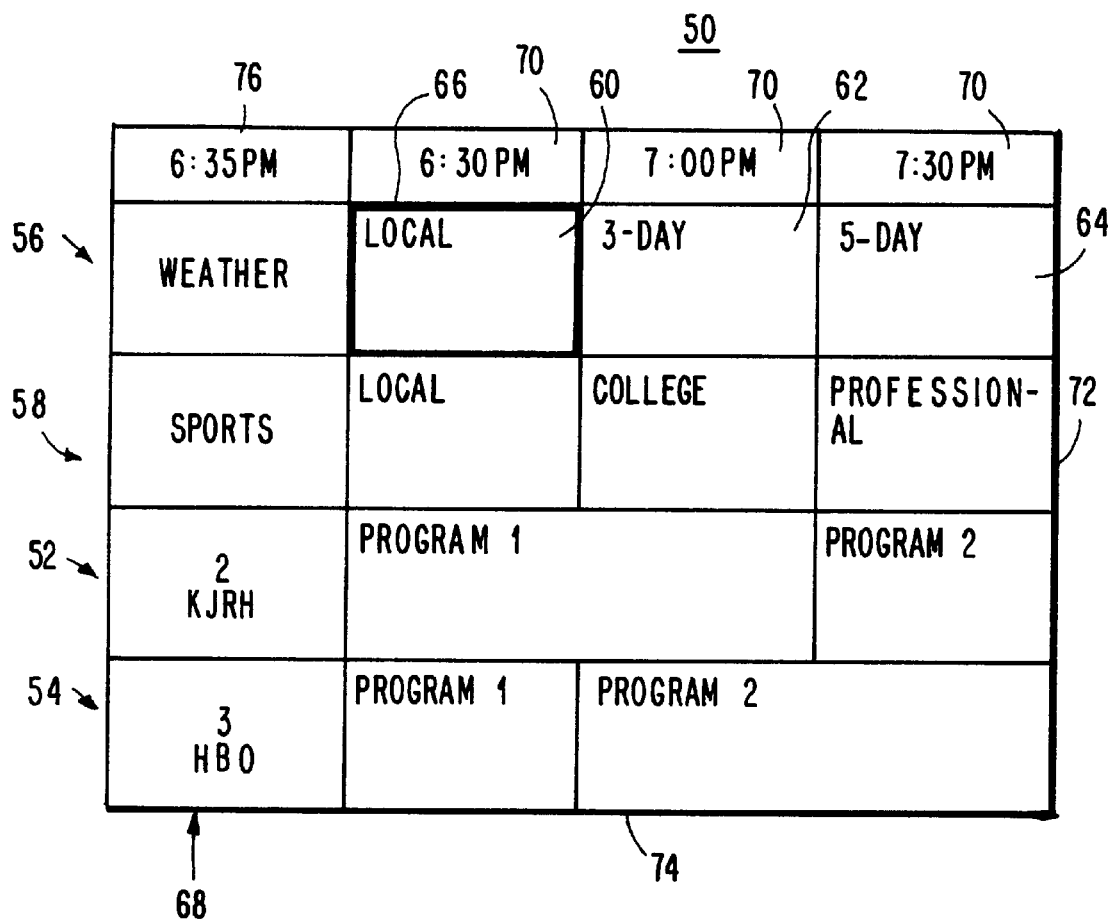

When a user indicates a desire to view television program guide information (e.g., by entering a command with user input interface 46), control circuitry 42 generates a video image of a program guide grid. The information for the program grid may be contained in the data provided to control circuitry 42 from data source 14 (FIG. 1) in main facility 12 (FIG. 1). An illustrative program grid 50 is shown in FIG. 4. Program grid 50 has program listings rows 52 and 54. Program listings row 52 contains program listings for programs 1 and 2 on channel 2 (KJRH) during the time slots 6:30 PM, 7:00 PM, and 7:30 PM. Program listings row 54 contains program listings for programs 1 and 2 on channel 3 (HBO).

Grid rows 56 and 58 contain non-program listings. Non-program listings do not contain television program listings information and are generally unrelated to television programming. Grid row 56 contains selectable non-program options for weather related information. Grid cell 60 contains a selectable non-program option for "local weather." Grid cells 62 and 64 contain respective selectable non-program options for "3-day" and "5-day" weather. Grid row 58 contains selectable non-program options for "local," "college," and "professional" sports.

Program grid 50 preferably has movable cell highlight region 66, which highlights the current grid cell. The range of movement of highlight region 66 is typically bounded by column 68 on the left, by program listings time cells 70 on the top, by screen boundary 72 on the right, and by lower screen boundary 74 on the bottom. Time cell 76 may be used to display the current time.

The user may position highlight 66 by entering appropriate commands with user input interface 46. For example, if user input interface 46 is a remote control such as remote control 40 of FIG. 2, the user can position highlight region 66 using cursors. As shown in FIG. 5, if the user repeatedly moves highlight region 66 until it reaches lower screen boundary 74, further attempts at downward movement cause the program listings and non-program options to scroll in the vertical direction. In the illustrative example of FIG. 5, non-program options row 56 has scrolled off of the top of grid 50. Non-program options row 58 has scrolled to the top row position of grid 50. Program listings rows 52 and 54 have also been moved up one position in the grid. A new program listings row 55 is displayed at the bottom of grid 50.

The movement of the listings in grid 50 when highlight region 66 is panned (i.e., moved to the right or left) depends on whether highlight region 66 is in a program listings row (such as row 52, 54, or 55) or whether highlight region 66 is in a non-program options row (such as row 56 or 58). As shown in FIG. 6, if highlight region 66 is in a program listings row such as program listings row 52, panning highlight region 66 to the right causes the program listings in both programs listings rows 52 and 54 to pan to the left by an equal amount. This allows new program listings such as program 3 in row 52 and program 3 in row 54 to be displayed on the right side of grid 50. Time cells 70 are also adjusted accordingly (i.e., by incrementing each cell by 30 minutes in this example). If highlight region 66 is panned to the left, the program listings in rows 52 and 54 pan to the right.

Because the non-program options in rows such as rows 56 and 58 are not generally associated with any particular time cell value, panning highlight region 66 to the right or left in a non-program options row does not cause any movement in the program listings or in the time cells. Panning highlight region 66 in the non-program options rows preferably does not cause any movement in the non-program options. However, if it is necessary to display additional options (e.g., 7-day weather in row 56), it may be desirable to allow limited panning in the non-program option rows. Such additional panning in the non-program option rows preferably does not cause movement of either program listings or time cells.

After a user positions highlight region 66 on a desired selectable non-program option, the user may obtain additional information (typically text or graphics but possibly video) by selecting that option. The user obtains this additional information without exiting grid 50. The user makes selections by entering appropriate selection commands with user input interface 46 (FIG. 3). If user input interface 46 is a remote control such as remote control 40 of FIG. 2, the user may press an "enter" or "info" button to make a selection.

Making a selection causes control circuitry 42 (FIG. 3) to display the additional information associated with the selectable non-program option. The additional information that is supplied is preferably based on data that is periodically received by control circuitry 42 (FIG. 3) from data source 14 (FIG. 1) in main facility 12 (FIG. 1). In the illustrative example shown in FIG. 4, highlight region 66 has been positioned on the local weather option in cell 60. Selecting option 60 therefore causes control circuitry 42 (FIG. 3) to display an additional information screen 78 that contains additional information on local weather, as shown in FIG. 7. When the user has finished viewing the additional information in screen 78, the user may direct control circuitry 42 to return to grid 50.

The display format for additional information that is shown in FIG. 7 is illustrative only. Other suitable display formats include a full screen display, a pop-up window (e.g., on top of but not completely covering grid 50 of FIG. 4), etc. In addition, the illustrative non-program options shown in FIGS. 4–6 are illustrative. Any other suitable non-program information may be provided. Additional illustrative examples include: a row for basketball having selectable options for "local," "college," and "professional;" a row for local sports having selectable options for "baseball," "basketball," and "football;" and a row for local football having selectable options for "class A," "class 2A," "class 3A," and "class 4A" (this last cell being accessed by panning). The additional information for such selectable sports options may contain information on scores, special events, game highlights, etc.

A further illustrative example is a row of non-program options for local events. The selectable non-program options associated with this row may be "this weekend," "this week," and "this month." When the user selects "this weekend," additional information on the time and place of a county fair scheduled for the upcoming weekend or the time and place of a local home and garden show may be provided.

Another aspect of the invention involves displaying video material on the user's display screen. Such video material may be processed by control circuitry 42 (FIG. 3) and displayed on monitor 48 (FIG. 3) at the same time that grid 50 is displayed (e.g., by displaying the video material on the display screen above grid 50). Typical video material may include national advertisements and promotional videos (e.g., for pay-per-view or premium channel television events). The video material to be displayed may be provided by a video source in main facility 12 (FIG. 1) and may be distributed by television distribution facility 16 (FIG. 1).

If desired, program listings may be provided with selectable grid cells. When a user selects a given program listings cell, circuitry 42 (FIG. 3) may display additional information for the selected television program listing (e.g., a program description).

In addition, the program option and channel entries in column 68 (FIG. 4) may be selectable. With this type of arrangement, selecting "weather" in column 68 causes control circuitry 42 (FIG. 3) to tune to an associated weather television channel or to provide general information about weather.

In the program grid of the present invention, rows typically contain information for different television channels and non-program subjects. However, this information could be placed in columns. Columns are typically associated with different program start times or different selectable non-program options, but such information could be place in rows.

Figure 8:
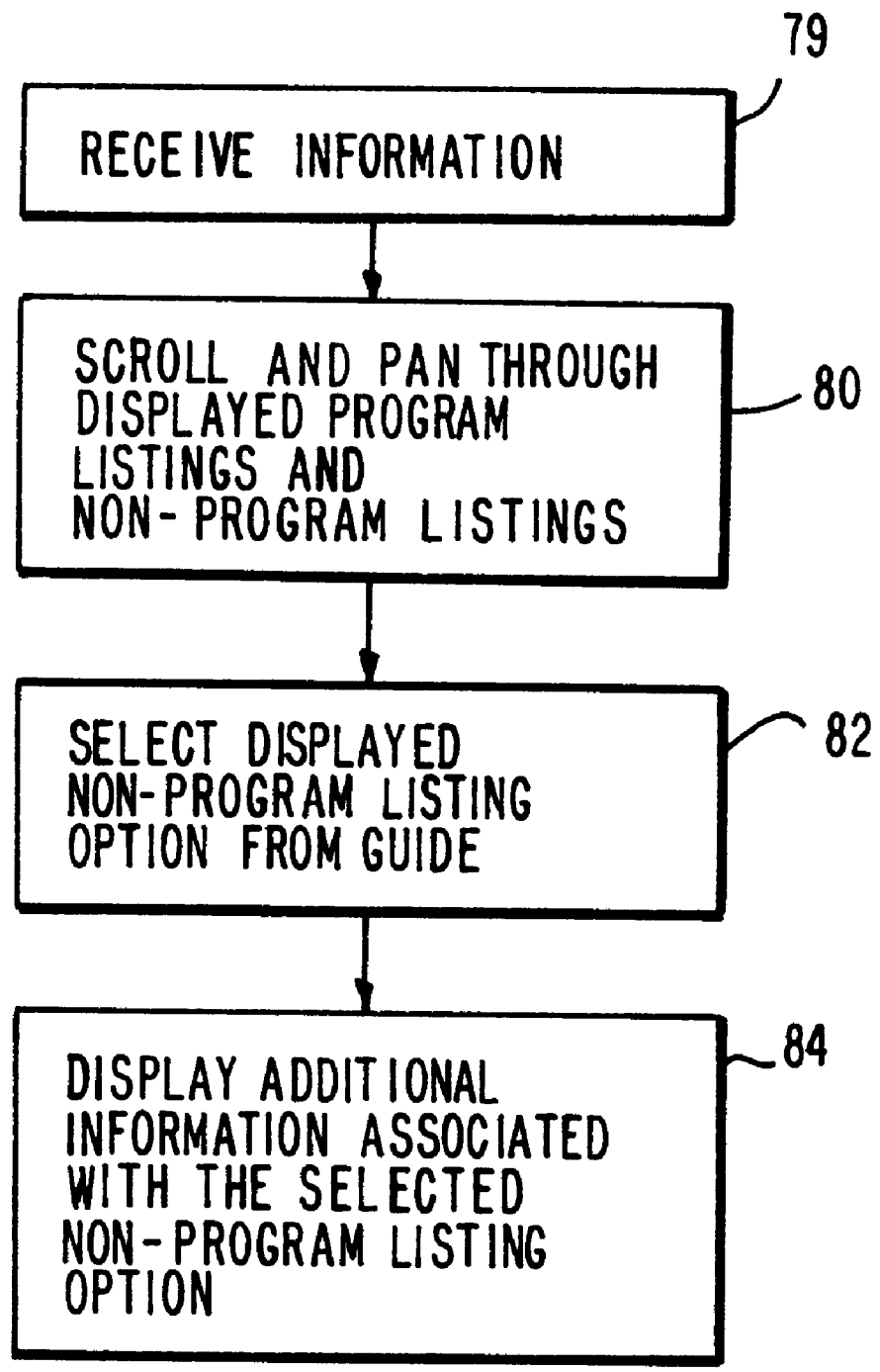
FIG. 8 is a flow chart of steps involved in the operation of the present invention.

Steps involved in operating the program guide of the present invention are set forth in FIG. 8. At step 79, information on program listings and non-program options is received by control circuitry 42 (FIG. 3). At step 80, the user may scroll and pan through the displayed television listings and non-program listings. Once the user has positioned highlight region 66 (FIG. 4) on a desired selectable non-program option, the option may be selected at step 82 (e.g., by pressing an "enter" or "select" or "info" key on a remote control). At step 84, control circuitry 42 (FIG. 3) displays an additional information screen associated with the selected non-program option.

The foregoing is merely illustrative of the principles of this invention and various modifications can be made by those skilled in the art without departing from the scope and spirit of the invention.

What is claimed is:

1. User equipment for use in an interactive program guide system in which information for television program listings and selectable non-program options is provided to a distribution facility, comprising:

means for receiving the information from the distribution facility; and means for simultaneously displaying the television program listings in one row of a grid and a plurality of simultaneously available selectable non-program options in another row of the grid.

2. The user equipment defined in claim 1 further comprising means for displaying additional information when one of the selectable non-program options is selected.

3. The user equipment defined in claim 1 wherein the means for receiving further comprises means for receiving information from a cable system headend.

4. The user equipment defined in claim 1 wherein the means for receiving further comprises means for receiving information from a satellite television distribution facility.

5. The user equipment defined in claim 1 wherein the means for receiving further comprises a set-top box.

6. The user equipment defined in claim 1 wherein the means for simultaneously displaying further comprises means for simultaneously displaying a plurality of rows of television program listings in the grid.

7. The user equipment defined in claim 1 wherein the means for simultaneously displaying further comprises means for simultaneously displaying a plurality of rows of non-program options in the grid.

8. The user equipment defined in claim 1 wherein the means for simultaneously displaying further comprises means for simultaneously displaying the television program listings and selectable weather options.

9. The user equipment defined in claim 1 wherein the means for simultaneously displaying further comprises means for simultaneously displaying the television program listings and selectable sports options.

10. The user equipment defined in claim 1 wherein the means for simultaneously displaying further comprises means for simultaneously displaying the television program listings and selectable local events options.

11. The user equipment defined in claim 1 further comprising means for positioning a highlight region on one of the selectable non-program options.

12. The user equipment defined in claim 1 further comprising means for scrolling the grid.

13. The user equipment defined in claim 1 further comprising means for panning the television program listings without panning the non-program options.

14. A method for using user equipment in an interactive program guide system in which information for television program listings and selectable non-program options is provided to a distribution facility, comprising the steps of:

receiving the information from the distribution facility; and simultaneously displaying the television program listings in one row of a grid and a plurality of simultaneously available selectable non-program options in another row of the grid.

15. The method defined in claim 14 further comprising the step of displaying additional information when one of the selectable non-program options is selected.

16. The method defined in claim 14 wherein the step of receiving further comprises the step of receiving information from a cable system headend.

17. The method defined in claim 14 wherein the step of receiving further comprises the step of receiving information from a satellite television distribution facility.

18. The method defined in claim 14 further comprising the step of receiving the information with a set-top box.

19. The method defined in claim 14 wherein the step of simultaneously displaying further comprises the step of displaying a plurality of rows of television program listings in the grid.

20. The method defined in claim 14 wherein the step of simultaneously displaying further comprises the step of simultaneously displaying a plurality of rows of non-program options in the grid.

21. The method defined in claim 14 wherein the step of simultaneously displaying further comprises the step of simultaneously displaying the television program listings and selectable weather options.

22. The method defined in claim 14 wherein the step of simultaneously displaying further comprises the step of simultaneously displaying the television program listings and selectable sports options.

23. The method defined in claim 14 wherein the step of simultaneously displaying further comprises the step of simultaneously displaying the television program listings and selectable local events options.

24. The method defined in claim 14 further comprising the step of positioning a highlight region on one of the selectable non-program options.

25. The method defined in claim 14 further comprising the step of scrolling the grid.

26. The method defined in claim 14 further comprising the step of panning the television program listings without panning the non-program options.

27. User equipment for use in an interactive program guide system in which information for television program listings and selectable non-program options is provided to a distribution facility, comprising:

a monitor; and control circuitry that receives the information from the distribution facility, wherein the control circuitry is configured to simultaneously display the television program listings in one row of a grid and a plurality of simultaneously available selectable non-program options in another row of the grid.

28. The user equipment defined in claim 27 wherein the control circuitry is further configured to display additional information when one of the selectable non-program options is selected.

29. The user equipment defined in claim 27 wherein the control circuitry is further configured to receive information from a cable system headend.

30. The user equipment defined in claim 27 wherein the control circuitry is further configured to receive information from a satellite television distribution facility.

31. The user equipment defined in claim 27 wherein the control circuitry includes a set-top box.

32. The user equipment defined in claim 27 wherein the control circuitry is further configured to simultaneously display a plurality of rows of television program listings in the grid.

33. The user equipment defined in claim 27 wherein the control circuitry is further configured to display a plurality of rows of non-program options in the grid.

34. The user equipment defined in claim 27 wherein the control circuitry is further configured to simultaneously display the television program listings and selectable weather options.

35. The user equipment defined in claim 27 wherein the control circuitry is further configured to simultaneously display the television program listings and selectable sports options.

36. The user equipment defined in claim 27 wherein the control circuitry is further configured to simultaneously display the television program listings and selectable local events options.

37. The user equipment defined in claim 27 wherein the control circuitry is further configured to position a highlight region on one of the selectable non-program options.

38. The user equipment defined in claim 27 wherein the control circuitry is further configured to scroll the grid.

39. The user equipment defined in claim 27 wherein the control circuitry is further configured to pan the television program listings without panning the non-program options.

* * * * *

UNITED STATES PATENT AND TRADEMARK OFFICE
CERTIFICATE OF CORRECTION

PATENT NO.    : 6,061,097
DATED         : May 9, 2000
INVENTOR(S)   : Kevin D. Satterfield It is certified that error appears in the above-identified patent and that said Letters Patent is hereby corrected as shown below:

<u>Title page,</u>
Item [56], References Cited, U.S. PATENT DOCUMENTS,
Change "5,444,499  8/1995" to -- 5,444,499  9/1995 --;
Change "5,635,978  6/1997" to -- 5,635,978  7/1997 --;

Item [56], References Cited, FOREIGN PATENT DOCUMENTS, change
"WO 97/42783 A1" to -- WO 97/42763 A1 --;

Item [56], References Cited, OTHER PUBLICATIONS,
Change "McKenzie, G. A." to -- McKenzie, G.A. --;
Change "S. M. Edwardson" to -- S.M. Edwardson --; and
Change "Vito Brugliera, . . . 18 th International Television Symposium and Technical Exhibition" to -- Vito Brugliera, . . . 18th International Television Symposium and Technical Exhibition --.

Signed and Sealed this

Nineteenth Day of November, 2002

*Attest:*

JAMES E. ROGAN
*Attesting Officer*     *Director of the United States Patent and Trademark Office*